J. P. TARBOX.
METHOD OF AND APPARATUS FOR BALANCING AIRCRAFT.
APPLICATION FILED AUG. 15, 1912.

1,201,648.

Patented Oct. 17, 1916.
5 SHEETS—SHEET 1.

J. P. TARBOX.
METHOD OF AND APPARATUS FOR BALANCING AIRCRAFT.
APPLICATION FILED AUG. 15, 1912.

1,201,648.

Patented Oct. 17, 1916.
5 SHEETS—SHEET 2.

Fig 2

Inventor
John P. Tarbox

Witnesses

J. P. TARBOX.
METHOD OF AND APPARATUS FOR BALANCING AIRCRAFT.
APPLICATION FILED AUG. 15, 1912.

1,201,648.

Patented Oct. 17, 1916.
5 SHEETS—SHEET 3.

Fig 3

UNITED STATES PATENT OFFICE.

JOHN P. TARBOX, OF WASHINGTON, DISTRICT OF COLUMBIA.

METHOD OF AND APPARATUS FOR BALANCING AIRCRAFT.

1,201,648.

Specification of Letters Patent.

Patented Oct. 17, 1916.

Application filed August 15, 1912. Serial No. 715,277.

*To all whom it may concern:*

Be it known that I, JOHN P. TARBOX, a citizen of the United States, residing at Washington, District of Columbia, have invented a new and useful Improvement in Methods of and Apparatus for Balancing Aircraft, of which the following is a specification.

My invention consists of a balancing mechanism of the servo-motor type, in which there is provided a source of power, power transmitting means, operating means for balancing devices associated therewith, power controlling means controlling the application of power to said operating means, a standard of position governing said controlling means and determining the operation of the balancing devices thereby, and what is commonly known as a follow-up connection between the controlling means and the operative means for the balancing devices.

Specifically, my invention has particularly to do with such a mechanism which will establish a checking force as the air-craft approaches normal from any position of unbalancing whereby the momentum of the craft is checked, and it is stopped precisely at normal without rocking or oscillation. My co-pending application Serial No. 715,276 filed August 15, 1912, has to do with a method of balancing the air-craft according to which such a checking force is set up.

My present invention also includes a method according to which a checking force is set up, which method I shall claim herein, the method of the present invention being a specific improvement over and above the method of the application referred to.

Figure 1:
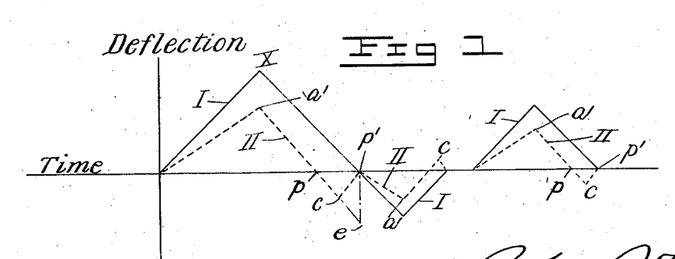
Fig. 1, previously mentioned, is a diagram showing the curves of the craft and balancing devices respectively during excursions of unbalancing.

By reference to Figure 1 of the sheets of drawings presented herewith, the difference between the two methods will be clear. The full line curve, Roman numeral I, is the curve showing the excursion of the air-craft during unbalancing, while the dotted line curve, Roman numeral II, shows the excursion of the balancing devices in opposition to the unbalancing. The balancing devices move outwardly with the craft to a position of maximum deflection $a'$, proportionately to the unbalancing of the craft. Upon the ensuing response of the craft to the corrective force set up, the balancing devices are moved back to normal before the craft reaches normal, and thereupon moved past normal in the opposite direction to set up the checking force which damps the momentum of the craft as it approaches normal. In my co-pending application referred to, the method of my invention includes the sudden returning of the balancing devices to normal after the checking force has been set up, by a practically instantaneous movement, the maximum checking force being reached as the craft comes to a halt at normal. This is shown by the dot and dash extension $e$. According to the present method, however, the maximum checking force is reached just before the craft halts at normal position, and it is gradually decreased, (of course, in a very small interval of time) as the craft comes to a halt at normal. Thus, according to the present method the curve of the checking force approximates in shape an isosceles triangle, while according to the other method, the curve approximates a right-angle triangle with the right-angle at the normal position of the craft.

The method of the present invention is practiced by the use of a follow-up connection in the servo-motor mechanism above described, which follow-up connection is constituted by a reversible fast-forward and slow-return movement. By this means, the controlling means or the standard of position, as the case may be, is given a follow-up movement during the forward movement of the balancing devices proportionately greater than the follow-up movement on the return of the balancing devices to normal, whereby the power supplied the operating means is cut off earlier on the forward movement of the balancing devices than it is on the return movement of the balancing devices, whereby the balancing devices are moved through a greater distance on the return movement than they are moved on the forward movement with the result that on the return movement they are moved past normal to establish the checking force. At or near the cut-off point, a shifting of the controlling means or standard of position is accomplished, whereby the return of the balancing devices takes place with the craft to normal.

One embodiment of my invention is shown in the accompanying drawings, in which—

Figure 2:
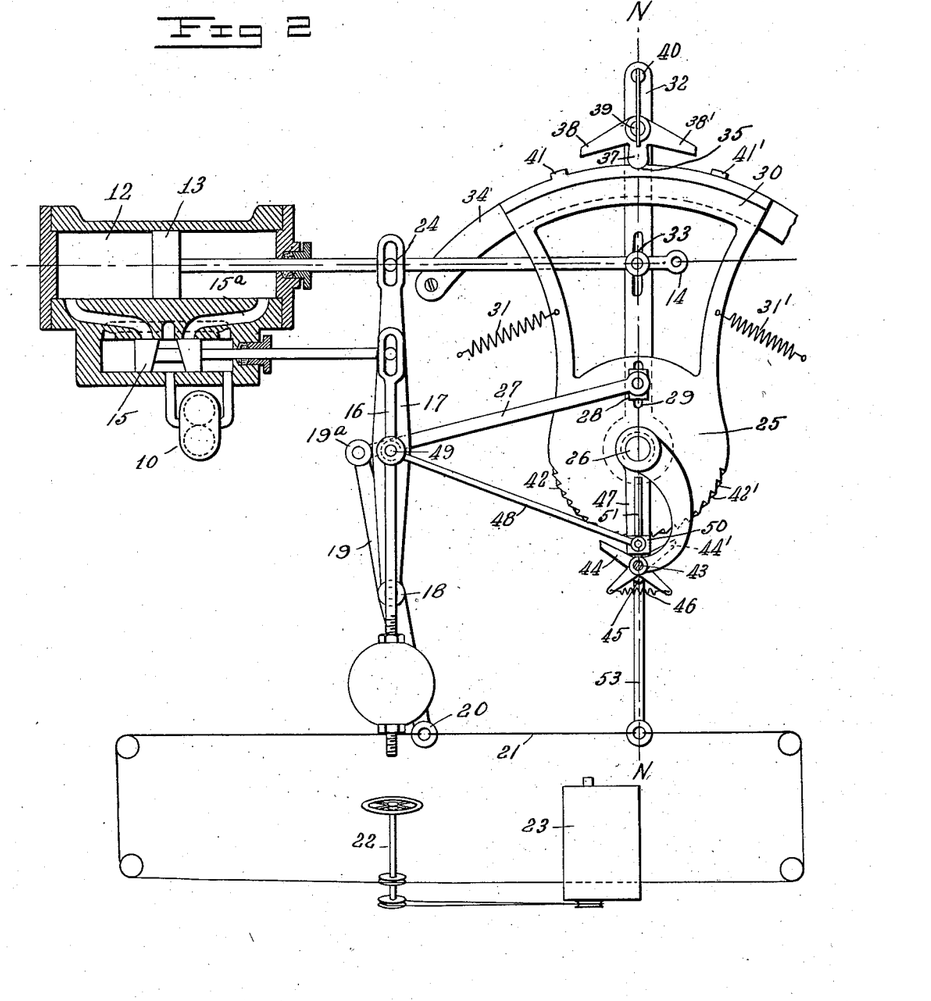
Fig. 2 is a diagrammatic sectional view of the mechanism of my invention when the craft is in normal position.
Figure 6:
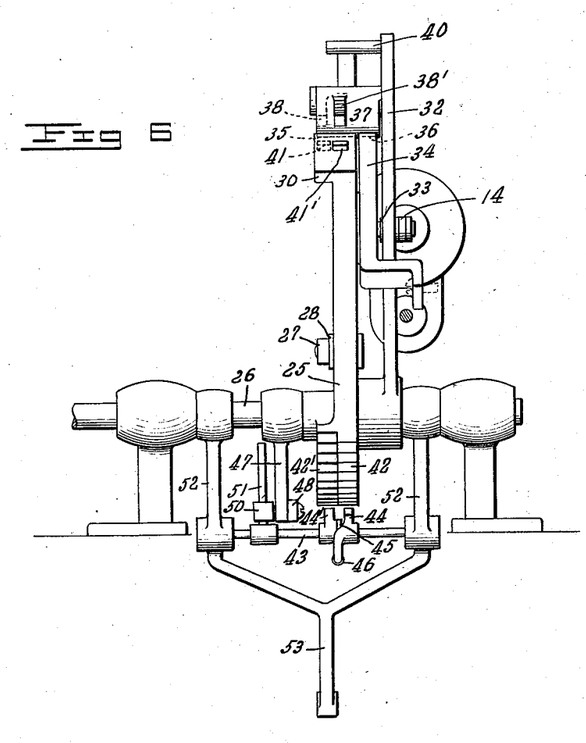
Fig. 6 is an end elevation showing the arrangement of the follow-up connection with respect to the remainder of the mechanism.

Referring first to Figs. 2 and 6, it will be seen that I have illustrated my invention in connection with a fluid-pressure servo-motor. This motor comprises a source of power in the form of a pump 10, and power transmitting means in the form of a cylinder 12 and piston 13, an operating means for balancing devices in the form of an extended piston rod 14, controlling means in the form of the valve 15 for controlling the transmission of power to the operating means 14, and a standard of position 16 in the form of a pendulum pivoted on a lever 17 and operatively connected with valve 15.

The lever 17 constitutes a part of the follow-up connection. At its lower end 18 it is pivoted intermediate the ends of a lever 19 which in turn is connected at its lower end 20 to the normally fixed cord 21 which is connected with the steering-gear 22 for operating the vertical rudder 23 of the craft. Whenever the vertical rudder 23 is shifted to cause the craft to turn right or left the lever 19 is shifted, resulting in a shifting of the standard 16, all as fully set forth in my co-pending application Serial No. 607,736 filed February 10, 1911. This action of itself forms no part of my present invention. The upper end of lever 17 is connected by a pin and slot connection 24 with the piston rod 14, whereby whenever the balancing devices are moved the lever 17 is shifted to shift the pivot of the pendulum 16 and effect through the pendulum the cut off of the supply of power by the valve 15. This is the usual follow-up action.

The upper end of lever 19 on which lever 17 is pivoted, is adjustably connected to disk 25 rotatable on a fixed shaft 26 by means of a link 27 pivotally connected to block 28 which may be fixed in any position in slot 29 in the disk 25. The normal position of the disk 25 is such that the connection 28—29 is on a normal line N—N perpendicular to the piston rod 14. The disk 25 is provided with a concentric segment 30, normally symmetrically disposed with reference to the line N—N. The disk and segment are biased to this normal position by the opposed springs 31—31', or the equivalent, being otherwise free to turn a limited distance around the fixed shaft 26. Also freely journaled on the shaft 26 is an upwardly extending lever 32 normally on line N—N, but connected by pin and slot connection 33 with the piston rod 14 which operates the balancing devices. Concentric with the segment 30, and having an upper face coinciding with the upper face of the segment 30 is a fixed segment 34 located immediately behind the segment 30. Each of these segments is provided with a notch, 35 in the movable segment 30 and 36 in the fixed segment 34, the notches normally coinciding on the line N—N. Normally engaging in the notches 35—36 is tooth 37 controlling the position of the oppositely pointed pawls 38—38' which are biased to the normally disengaged position shown by means of the flat spring connecting their pivot 39 with a fixed pin 40 on the lever 32 on which the pawls are pivoted. The pawls 38—38' are not precisely in line with each other longitudinally, being displaced in order to independently engage the laterally displaced lugs 41—41' on the surface of the movable segment 30.

On the under side of the disk 25 connected with the segment 30 are provided a pair of oppositely disposed sets of ratchet-teeth 42—42'. A normally fixed transverse shaft 43 below and parallel to shaft 26 carries a pair of pawls 44—44' adapted to be brought into engagement with the ratchets 42—42'. The pawls themselves are freely journaled on the shaft 43, but are held in the normal position shown, against the sides of abutment 45 fixed to shaft 43 by means of spring 46 connecting their outer ends. An arm 47 depending from shaft 26 is pivotally connected both with a link 48 connected with the pivot 49 of the pendulum 16 and with a block 50 having a sliding connection with the shaft 43 and lying normally on line N—N. The shaft 43 is carried (Fig. 6) by a pair of brackets 52 depending from the shaft 26 and shiftable by means of lever 53 whenever the cord 21 of the vertical rudder 23 is shifted, whereby the shaft 43 together with the pawls, may be shifted one way or the other around shaft 26 when the pivot 49 of the pendulum 16 is shifted by the cord 21.

Figure 3:
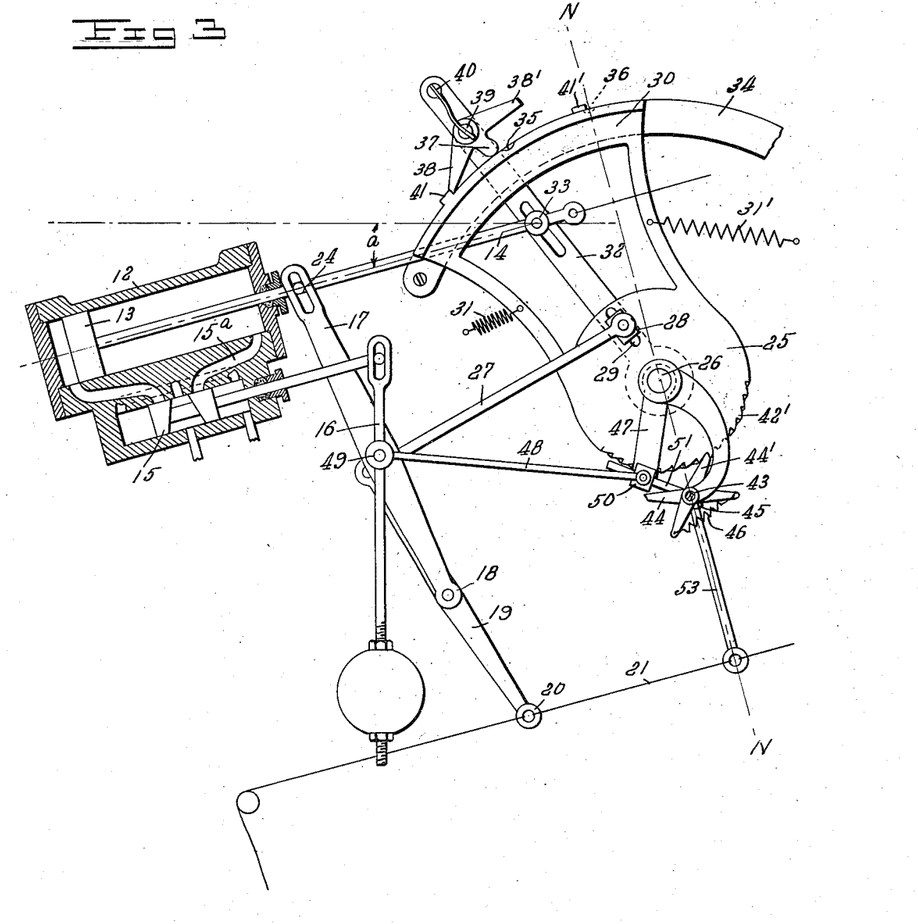
Fig. 3 is a similar view showing the positions of the parts when the craft is in an extreme position of unbalancing.

Now assuming an unbalancing of the craft to the left through an angle $a$, the servo-motor mechanism has operated to give the balancing devices a maximum deflection to a position $a'$ (Fig. 1), with the result that the parts take the position shown in Fig. 3. It is readily seen that upon initial downward movement to the left the pendulum 16 moves the valve 15 to the right, admitting fluid pressure by passage 15$^a$ to the right hand end of the cylinder 12, driving the piston 13 to the left. This movement of the piston 13 it will be observed has not only carried lever 17 to the left around its pivot 18, but through movement of the lever 32 to the left about shaft 26 has shifted the movable segment 30 together with the disk 25 and through the link 27 shifted the lever 19 to the left and with it the pivot 18 of lever 17 which it carries. Thus lever 17 is given a compound movement to the left which results in the pendulum being moved to the left at a higher rate of speed, than it would be if the pivot 18 were fixed, and the action of the follow-up connection were simple and through the connection of the lever 17 with the piston rod 14 alone. Thus the follow-up connection imparts to the pendulum standard of position 16 a relatively greater movement per unit of movement of the piston rod 14. And the valve 15 cuts off the supply of power to the cylinder 12 when the balancing devices have been moved through a relatively less distance than they would have been moved if the movement of the lever 17 had not been compound. The mechanism operates the balancing devices at a rate of speed sufficient to enable them to keep pace with the unbalancing of the craft. During this operation the left hand pawl 38 engages the left hand lug 41, by reason of the counter-clockwise tilting of the pawls 38—38' when the lever 32 is moved to the left with respect to the fixed segment 34, the tooth 37 having by this movement been moved to the right out of the notches 35—36. The segment 30 having been moved to the left, the tooth 37 is prevented from again entering notch 35 or notch 36 under the bias of spring 32, by reason of the displacement of the notches 35—36 from each other. The tooth 37 can only reenter the notches and the pawls 38—38' can only occupy their normal positions when the notches 35—36 coincide.

With the parts in the position shown, the segment 30 is held in its deflected position not only by the engagement of pawl 38 with lug 41, but also by engagement of pawl 44' with ratchet teeth 42' on the disk 25, the movement of the pivot 49 of the pendulum 16 to the left having oscillated the pin 51 and shaft 43 counter-clockwise through the link connection 48. Due to the close proximity of the block 50 to the shaft 43 in the normal position, the initial movement of the pivot 49 effects engagement of pawl 44' with the ratchet 42. When the craft commences to respond, the pendulum 16 moves the valve 15 to the left as the left hand end of the craft rises admitting fluid pressure to the left hand end of the cylinder 12 and moving the piston rod 14 and attached parts to the right, commencing the return of the balancing devices to normal. Thus the lever 32 and pawl 38 are moved to the right away from lug 41, the tooth 37 riding upon the peripheries of the segments 30 and 34, but the segment 30 does not return to normal with the lever 32, being held in deflected position by the pawl 44'.

Figure 4:
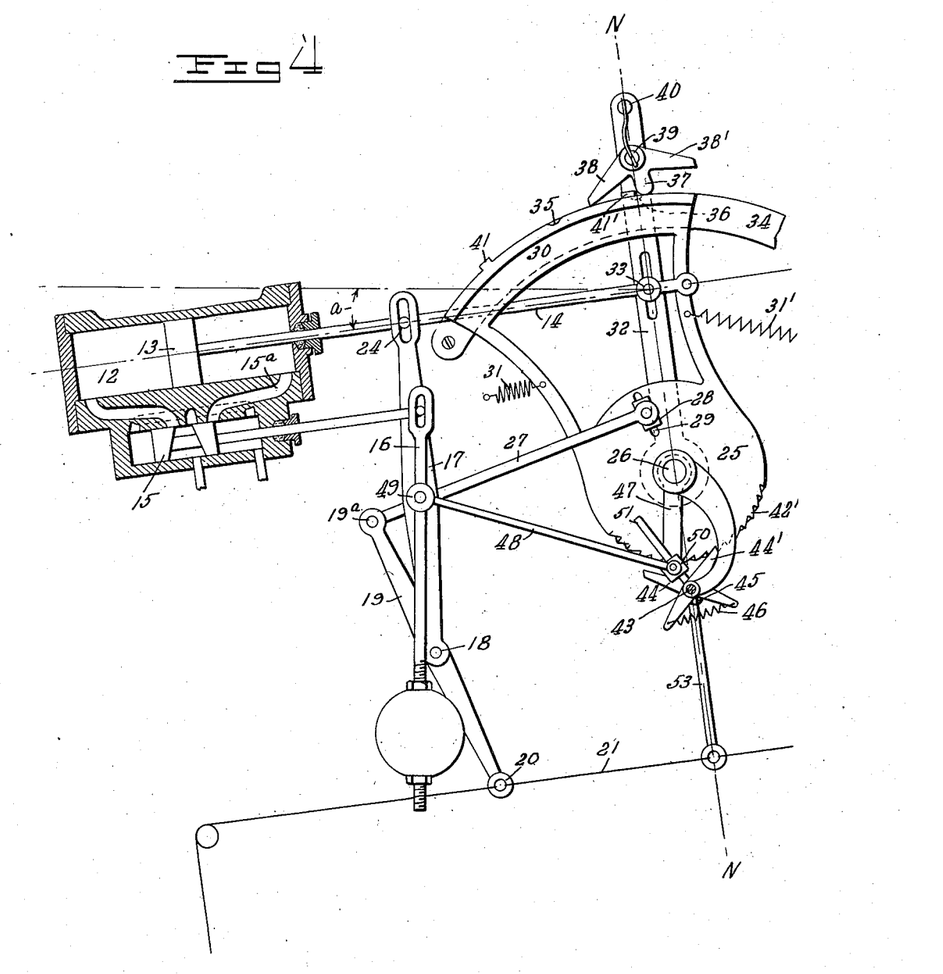
Fig. 4 is a similar view showing the positions of the parts after response has ensued, and just as the balancing devices reach normal and are in the act of passing normal to set up the checking force.

As the craft responds, the return movement of the balancing devices continues until they reach normal position as shown in Fig. 4. The angle $a$ it will be observed is less, the craft having not yet reached normal (see Fig. 1) though the balancing devices aforesaid have reached normal and are in the act of passing it (see the point $p$ Fig. 1). During this movement by reference to Fig. 4 it will be observed that the segment 30, and hence the lever 19 and pivot 18 of lever 17 have not moved, being in the same relative positions as respects the line N—N that they occupied when the craft was in the position of Fig. 3. Thus lever 17 during this return movement of the balancing devices is given only a simple movement by connection with the rod 14. The pivot 49 of the pendulum 16 is therefore moved at a relatively slower rate of speed than it was on the forward movement, with the result that the valve 15 cuts off later. As shown, the balancing devices have reached normal, the lever 32 having reached the normal line N—N as in Fig. 1, but the valve 15 still holds open to fluid pressure the left hand end of the cylinder 12. Thus the balancing devices are moved past normal in a reverse direction to set up a checking force in opposition to the momentum of the craft as it approaches normal.

Figure 5:
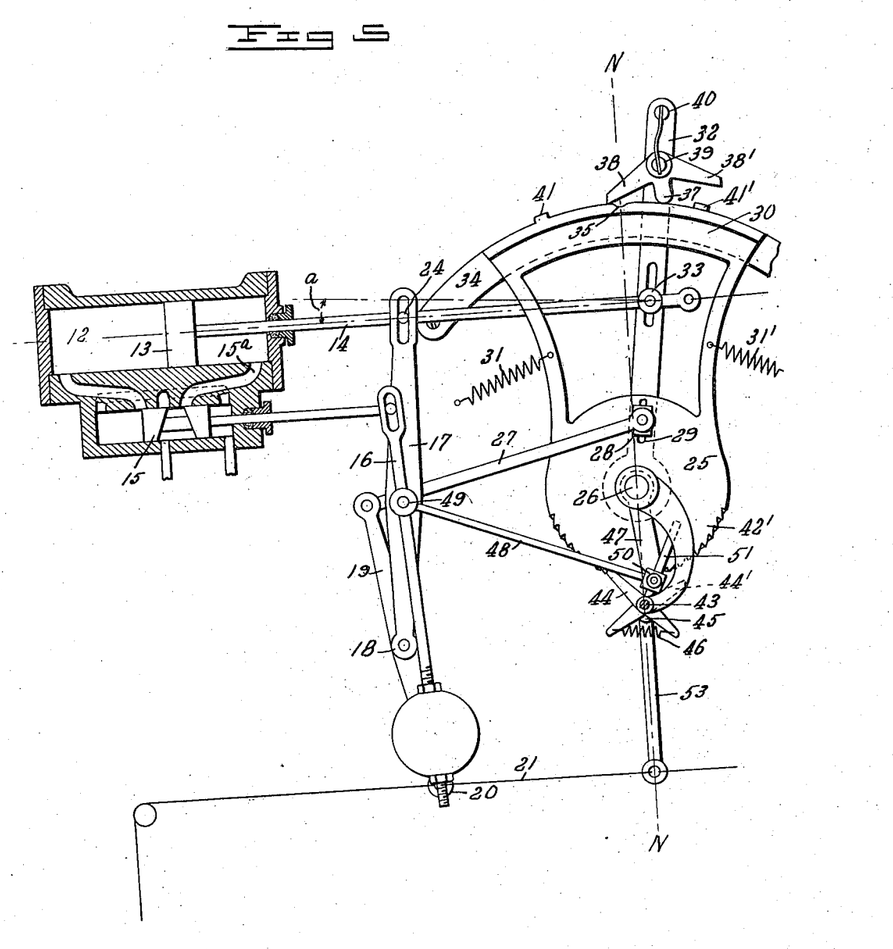
Fig. 5 is a similar view showing the positions of the parts the instant the maximum checking force has been set up, the balancing devices having reached their maximum reverse position, and the reverse movement of the controlling means or standard of position having been accomplished to start the balancing devices back to normal.

The position of the parts when the maximum checking force $c$ (Fig. 1) has been set up, is shown in Fig. 5. It will be observed that the lever 32, and hence the balancing devices connected with the operating piston rod 14, have been moved to the right of the normal line N—N. In this position of the balancing devices, however, something further takes place. The pivot 49 of the pendulum as shown in Fig. 4, has not yet reached its normal position, the balancing devices being in Fig. 4 in normal position, and the pivot having been returned toward normal at a slower rate of speed. Thus the shaft 43 is still tilted to the left and pawl 44' still engages ratchet 42'. In the movement of the balancing devices past normal, however, the pivot 49 reaches its normal position and disengages pawl 44'. Whereupon the springs 31—31' immediately restore the segment 30 to its normal position as shown in Fig. 5. This movement effects both a cut-off of the supply of power to the left hand end of the cylinder 12, and an admission of power to the right hand end of the cylinder 12, the pivot 18 of the lever 17 having been instantaneously shifted to the right through the instantaneous return movement of lever 19 to normal with the segment 30. Immediately the return of the balancing devices to normal takes place in unison with the movement of the craft through the small remaining angle $a$ to normal, with the result that both the balancing devices and the craft reach normal at the same time, and due to the establishment of the checking force and its maintenance during this latter portion of the return movement of the craft, the craft stops still, precisely at the normal position.

During the last stage of the operation commencing with the parts in the position shown in Fig. 5, it will be observed that pawl 44 is in engagement with ratchet 42, the pivot 49 of the pendulum having been moved to the right of its normal position, but this is without effect, since the pawl 38 does not engage lug 41 until returned to normal position and past it. Promptly upon reaching normal position as shown in Fig. 2, the tooth 37 jumps into the notches 35—36 and the pawls 38—38' return to normal position, and all the parts are in the normal position shown in Fig. 2.

When the unbalancing of the craft is to the right instead of to the left, the operation is the reverse of that just described, the pawl 38' engaging lug 41' and pawl 44 initially engaging ratchet 42, in the fast compound forward movement of the lever 17, while the ensuing slower return movement is to the left, and the checking force is, of course, set up in the opposite direction through a final left hand movement of lever 32, similar to the right hand movement shown in Fig. 5. With this operation of the mechanism in mind, it will be seen that with a less unbalancing movement there would be a correspondingly less movement of the piston rod 14, and a less initial deflection of the balancing devices, with a smaller corrective force. Thus the initial corrective force set up is always proportional to the unbalancing of the craft. So also, the checking force, being determined in each case by the maximum movement of the piston rod 14 which sets the pivot 18 of the lever 17 through the segment 34 and attached parts,—is proportional to the unbalancing of the craft. These factors are thus the same as in my copending application initially referred to. But the checking force, instead of being suddenly removed, is gradually removed through operation of the mechanism itself. The sudden return of the pivot 18 of lever 17 to its normal position, results in indirect operation of the balancing devices by the mechanism instead of direct operation of the balancing devices, as in my co-pending application.

Whenever it is desired to bank the craft to make a turn, the cord 21 is operated to shift the lever 19 around its pivot 19ª thus shifting pivot 49 of the pendulum to effect the necessary banking. During this shifting the segment 30 is held in normal position by springs 31—31' and by the pawls 38—38', which engage one or the other of the lugs 41—41' whenever force is applied to lever 27 through movement of lever 19 by cord 21. The presence of tooth 37 in notches 35—36 also tends to hold the segment 30 in normal position.

It is not desirable that the symmetrical action of the fast-forward and slow-return movement of the follow-up mechanism (symmetrical as respects movements on opposite sides of their normal position) be interfered with through shifting of the pendulum pivot 49 to effect banking as it would be if shaft 43 were fixed, the engagement of one of the pawls 44—44' being brought about through the ensuing movement of link 48 at the wrong time. Therefore, connection 53 with the cord 21 is provided whereby the shaft 43 is shifted around the shaft 26 in the same general direction as the pivot 49, and in such degree as to keep pace with it and prevent the engagement of pawls 44—44' until such time as the balancing devices are operated in response to the shifting of the pendulum pivot 49. This connection 53 may or may not be used as desired. The mechanism is operative in either case.

The embodiment of my invention which I have described is the best form now known to me, but my invention is capable of many other embodiments without departing in anywise from its generic spirit. Even the embodiment which I have shown, may be compacted and its elements re-arranged to secure lightness, and compactness, and to change the degrees of movement of the several parts without in anywise departing from its elemental and essential nature. All such changes may be most readily made by those skilled in the art, and all of them fall within the scope of my invention, and are covered by the annexed claims.

I particularly wish it understood that any fast forward and slow return movement, or any double follow-up connection of the general class to which the specific movements disclosed belong, may be used instead of those disclosed.

The showing for my invention is principally diagrammatic for the purpose of clear illustration.

By the term "standard of position", used herein and in the annexed claims, I mean any automatically acting primary control element governing or having any control over the angular position of the plane of the craft with respect to the horizontal plane or surface of the earth.

Claims:

1. The method of balancing an aircraft which consists in setting up a momentum checking force as the craft is returned to normal under the effect of corrective forces and of a value bearing a determinate ratio to the corrective force used during an unbalancing of the craft according to the degree of unbalancing, and independent of the rate of return of the craft to normal position, and gradually removing said checking force as the craft approaches normal position.

2. The method of balancing aircraft which consists in invariably setting up a checking force bearing a uniform ratio to the corrective force used during any unbalancing of the craft, said checking force being gradually increased to a maximum reached in the return to normal movement of the craft when the angle between the position of the craft at the maximum of the checking force and the normal position of the craft is approximately one-half of the angle between the position of the craft at inception of the checking force and the normal position of the craft, and as the craft passes through the remaining half of said angle into normal position, gradually decreasing the checking force from maximum to zero.

3. The method of balancing an aircraft which consists (1) in establishing the corrective forces with the forward unbalancing of the craft progressively and substantially proportional thereto, (2) as the craft responds and returns toward normal progressively removing the corrective force in greater proportion than it was established whereby the initial proportion between the movement of the craft and the corrective forces is destroyed and the corrective force is entirely removed before the craft reaches normal, (3) thereupon progressively setting up a maximum checking force in the opposite direction before the craft reaches normal (4) and progressively effecting the removal of the checking force as the craft moves into normal position.

4. An automatic balancing system for aircraft comprising balancing devices, a power driven actuating mechanism for said balancing devices, a standard of position controlling the operation of said power driven mechanism, and means arranged to vary the relative extent of direct and reverse movements of the actuating mechanism upon unbalancing and return movements of the craft interpolated between said standard of position and said actuating mechanism and actuated through operation of the said actuating mechanism.

5. An automatic balancing system, comprising balancing devices, a power driven actuating mechanism for said balancing devices for imparting to said balancing devices direct and reverse movements upon movement of the craft from a determinate normal position and return thereto, a standard of position governing the operation of said actuating mechanism, and an actuating movement modifying device set during a direct actuating movement of said mechanism and modifying in accordance with its setting the reverse actuating movement thereof.

6. An automatic balancing system for aircraft, comprising balancing devices, a power driven actuating mechanism for imparting to said balancing devices forward and return movements from normal position, a standard of position arranged to govern the operation of said actuating mechanism in accordance with the position of said craft, a control transmitting mechanism intermediate said standard of position and said actuating mechanism, including a differentially acting control movement device one element of which at a time is active in one direction of movement of said actuating mechanism, and a multiple number of elements of which are active simultaneously in opposite direction of movement of said actuating mechanism whereby the balancing devices are actuated to different extents according to the directions in which they are moved from or toward normal.

7. An automatic balancing system for aircraft, comprising balancing devices, a power driven actuating mechanism for imparting to said balancing means forward and return movements from normal position, a standard of position arranged to govern the operation of said actuating mechanism in accordance with the position of said craft, a control transmitting mechanism intermediate of said standard of position and said actuating mechanism, including a differentially acting control movement device one element of which at a time is active in one direction or movement of said actuating mechanism, and a multiple number of elements of which are active simultaneously in opposite direction of movement of said actuating mechanism whereby the balancing devices are actuated to different extents according to the directions in which they are moved from or toward normal, and a restoring device rendered active as the craft approaches normal position to restore the differentially acting control elements to normal positional relation.

8. The method of balancing a craft which consists in setting up a momentum checking force as the craft is returned to normal under the effect of corrective forces and of a value bearing a determinate ratio to the corrective force used during unbalancing of the craft according to the degree of unbalancing, and gradually removing said checking force as the craft reaches normal position.

9. The system of the character described comprising balancing devices, a servo motor for operating the same, a standard of position for controlling said servo motor and differential follow-up connections associated therewith and comprising a plurality of differentially acting elements one of which is operated synchronously with the operation of the balancing devices and the other of which is operated asynchronously.

10. A system of the character described comprising a servo-motor, a standard of position for controlling said motor and a variable ratio follow-up mechanism associated therewith, including means actuated through the initial operation of the servo motor to vary the ratio of transmission of the follow-up device during subsequent operation thereof whereby the movement of the balancing devices to different extents is produced according to the stage of their operation.

JOHN P. TARBOX

Witnesses:
JAMES H. MARR,
CHAS. S. GRAMMAN